United States Patent
Wood et al.

(10) Patent No.: US 6,192,159 B1
(45) Date of Patent: Feb. 20, 2001

(54) METHOD FOR ENCODING DIGITAL INFORMATION

(75) Inventors: Kenneth Robert Wood; Tristan John Richardson, both of Cambridge (GB)

(73) Assignee: AT&T Laboratories, Cambridge, Ltd. (GB)

( * ) Notice: Under 35 U.S.C. 154(b), the term of this patent shall be extended for 0 days.

(21) Appl. No.: 08/994,132

(22) Filed: Dec. 19, 1997

(30) Foreign Application Priority Data

Dec. 19, 1996 (GB) ................................................ 9626359

(51) Int. Cl.$^7$ .............................. G06K 9/36; G06K 9/46; H04N 1/41
(52) U.S. Cl. ........................ 382/245; 382/246; 358/261.1; 358/261.3
(58) Field of Search ..................................... 382/232, 178, 382/179, 244, 245, 246; 358/426, 261.1, 261.2, 261.3, 427

(56) References Cited

U.S. PATENT DOCUMENTS

| | | | | |
|---|---|---|---|---|
| 5,621,819 | * | 4/1997 | Hozumi ................................ | 382/232 |
| 5,689,586 | * | 11/1997 | Lin ........................................ | 382/232 |
| 5,751,850 | * | 5/1998 | Rindtorff ............................. | 382/178 |
| 5,754,698 | * | 5/1998 | Suzuki et al. ........................ | 382/232 |
| 5,850,485 | * | 12/1998 | Hart .................................... | 382/278 |
| 5,903,670 | * | 5/1999 | Chun et al. .......................... | 382/232 |

FOREIGN PATENT DOCUMENTS 0 052 335   11/1981   (EP) ................................ H04N/1/41

OTHER PUBLICATIONS

Mohamed, Sherif A., and Fahmy, Moustafa M., "Binary Image Compression Using Efficient Partitioning into Rectangular Regions." pp. 1888–1893. IEEE Transactions on Communications, vol. 43, No. 5, May 1995.

* cited by examiner

Primary Examiner—Amelia Au
Assistant Examiner—Mehrdad Dastouri
(74) Attorney, Agent, or Firm—Banner & Witcoff, Ltd.

(57) ABSTRACT

A method for encoding digital information to be transmitted from a first device to a second device, wherein the digital information is mapped according to a map of n rows and m columns which define a plurality of cells (n×m) and wherein each of said cells has a pixel value. The method is useful for compressing bitmapped images to be rendered by the simplest of graphics engines, Thus the method is particularly suited to the transmission of images to a relatively slow client on which the images are to be rendered in real time and on which any complex decompression would be too costly for such rendering. Raw compression ratios are comparable to those obtained with standard run-length encoding, but the number of drawing primitive calls required to render the compressed images directly is substantially less.

13 Claims, 1 Drawing Sheet

METHOD FOR ENCODING DIGITAL INFORMATION

FIELD OF THE INVENTION

This invention relates to a method for encoding digital information to be transmitted from a first device to a second device, wherein the digital information is mapped according to a map of rows and columns which define a plurality of cells and wherein each of said cells has a pixel value.

In particular this invention relates to a method for compressing bitmapped images in order to transmit them from a fast computing device (server). to a relatively slow computing device (client).

BACKGROUND TO THE INVENTION

It is known to encode a series of pixel values by using Runlength encoding (RLE) method.

RLE method takes raw data, as for example a series of pixel values, and encodes the series as a series of (count value) pairs so that long sequences of the same value can be represented by a relatively small amount of data. For example, the series of values: 12 12 12 100 100 100 100 100 30 30 4 4 4 4 4 4 4 4 4 4 4 4 4 4 could be run-length encoded as:

(3,12) (5,100) (2,30) (14,4)

Such RLE method is a standard technique developed in the 50s and used in many different areas including, for example, fax machines.

It is also known from background research (using both the World Wide Web and traditional journals and textbooks) that many ideas have been presented under the names 'area coding' and 'two-dimensional run-length encoding'. Unfortunately, no specific implementation details or academic references are available from any of the sources consulted. Moreover, the sources indicate that other efforts in this area use complex recursive algorithms which emphasise optimal solutions at the cost of long runtimes, and also that these other efforts are not geared for the transmission of images for real-time rendering by relatively slow computers.

This invention addresses the problem of transmitting bitmapped images from a relatively fast computing device (the server) to a relatively slow computing device (the client) in such a way that these images can be rendered quickly on the client.

Therefore it is a primary object of the present invention to provide a method for encoding bitmapped information which is simple, effective and useful for relatively slow computers for rendering of two dimensional images.

THE INVENTION

According to the present invention, there is provided a method for encoding digital information characterised by the following steps:

starting from a predetermined first cell having a certain pixel value, to determine the largest area of cells, adjacent to said first cell, having the same pixel value as said first cell;

to generate a code indicative of the row-column position of said first cell, of the dimensions of said largest area and of said pixel value common to all the cells of said area;

to proceed to a second cell, adjacent to said area and having a pixel value different from the pixel value of said first cell; and starting from said second cell, to determine another largest area of cells, adjacent to said second cell, having the same pixel value as said second cell;

to generate a code indicative of the row-column position of said second cell, of the dimensions of said largest area and of said pixel value common to all the cells of said area;

to repeat said steps until all cells of said digital information have been encoded.

According to a variant of the present invention, in an initial step, the most prevalent pixel value V is determined, either exactly by fully enumerating all pixel values, or probabilistically by enumerating a randomly selected subset of the pixel values. All cells with pixel value V are then ignored in the basic encoding process and the output is augmented with the value V and the overall dimensions of the input.

According to a second variant of the present invention, the background pixel value V is determined by is AS running the basic method of the invention and choosing the pixel value which appears in the greatest number of said largest areas, rather than simply the most prevalent value on a pixel-by-pixel basis.

BRIEF DESCRIPTION OF DRAWINGS

This and other characteristics of the present invention will become apparent when the following description of a preferred embodiment, provided by way of a non-exhaustive example, is considered in conjunction with the accompanying drawings, in which.

Figures 1, 2:
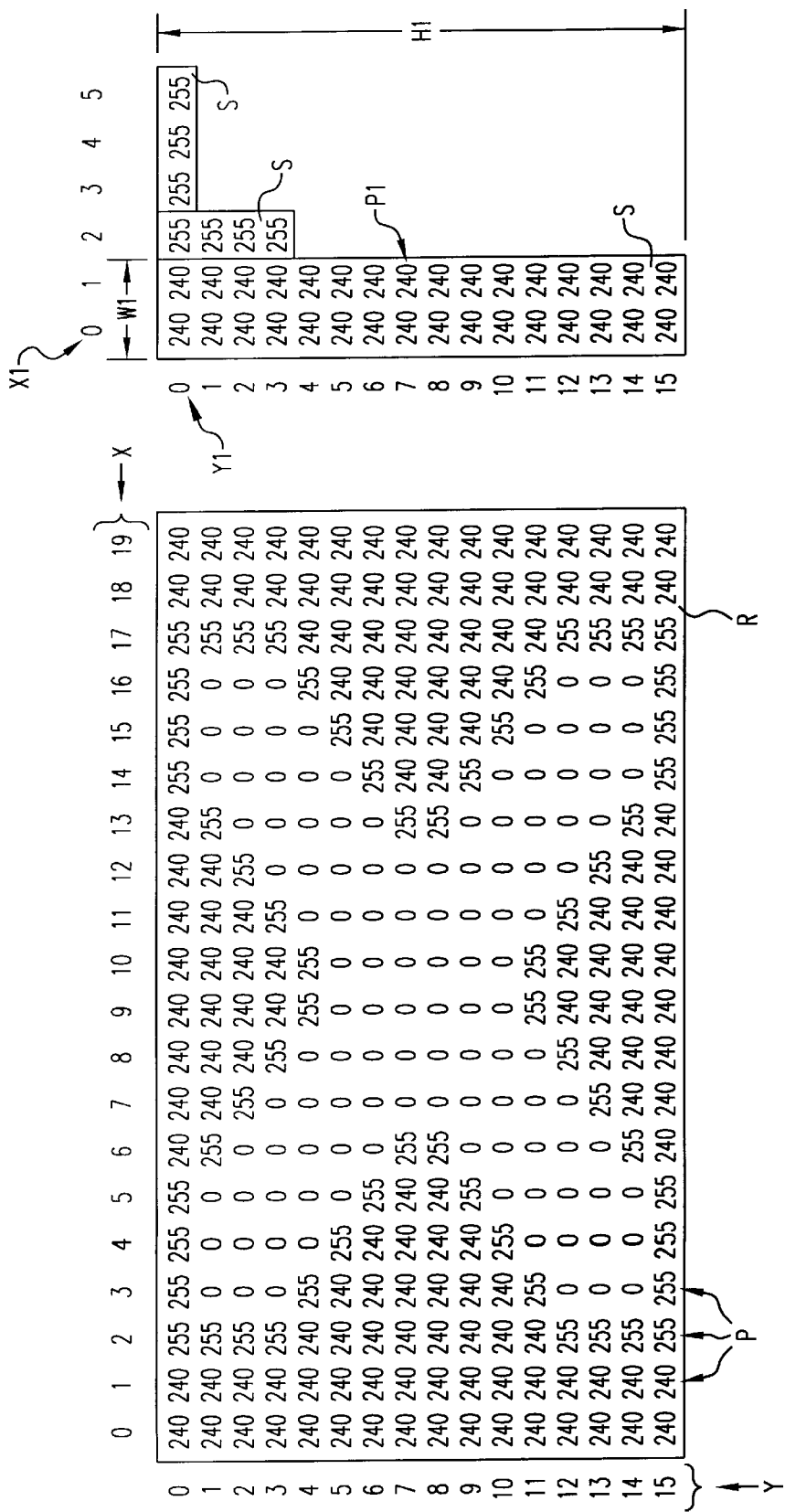
FIG. 1 represents a bitmapped rectangle of information to be encoded according to the present invention.
FIG. 2 represents sub-rectangles of the rectangle of FIG. 1.

Preferred Mode for Carrying out the Invention

The method of the invention (algorithm) takes as its input a bitmapped rectangle or information R of width W and height H. Each of the W×H cells of the rectangle contains a pixel of dimension P bits.

With reference to FIG. 1 it is shown such a rectangle R of width W 20 and height H 16. The pixels P in the figure are 8 bits in dimension and are shown in decimal notation in which they can vary from 0 to 255.

The rows of the rectangle are labelled with their indices Y from 0 to 15 and the columns with their indices X from 0 to 19 (the rectangle of FIG. 1, as its form indicates, represents the image of an X outlined by one colour and against a background of another).

The invention was developed with a specific client/server pair in mind, the server being a specially modified X-server running on a fast Unix computer, and the client being a Java applet running within a web browser on another computer. The applet in question takes bitmapped rectangles R from the specially modified X-server and renders them in a Java AWT panel.

The rectangles R represent changed areas of the X-server's display, and thus the applet (which also sends mouse and keyboard events back to the X-server) allows the user to interact with his or her X-server's applications within any Java-capable browser.

The idea of the invention is to produce from the rectangle R a set of sub-rectangles S (FIGS. 1 and 2) from which the original rectangle R can be reconstructed.

Each sub-rectangle S will consist of cells of a single pixel value and will be specified by a block of numbers (tuple) (P1, X1, Y1, W1, H1) where (P1) is the pixel value, (X1,Y1) represent the indices of the column and row of the original rectangle where the top-left corner of the sub-rectangle S appears, and (W1,H1) represent the width and height of the subrectangle S.

The output of the algorithm is a set of such tuples. The basic algorithm proceeds as follows:

1. Mark all cells of the rectangle R as free and name the top left cell of R as the new current cell c.
2. Determine the largest sub-rectangle S of the rectangle R whose top-left corner is the current cell C and which consists entirely of cells whose pixel values are the same as the value of the current cell C.
3. Output the tuple (P1,X1,Y1,W1,H1) where P1 is the pixel value of the current cell C, (X1,Y1) is the column-row position current cell C within the rectangle A, and (W1,H1) holds the width and height of the sub-rectangle S.
4. Mark all cells of sub-rectangle S as consumed (i.e. no longer free).
5. Proceed left-to-right and top-to-bottom from the current cell C until a free cell F is encountered (If no free cell F remains, the algorithm is done).
6. Name the free cell F as the current cell C and jump to step 2.

The output of the algorithm is the list of tuples produced at step 3 and the original rectangle R can be reconstructed by drawing all of the single-coloured sub-rectangles S specified by these tuples.

Thus, for example, the first few tuples output for the rectangle R shown in FIGS. 1 and 2 would be:

(240, 0, 0,2,16)

(255,2, 0,1,4)

(255, 3, 0,3,1).

Alternatively, the algorithm can start from any corner or from any point of the rectangle R. For example, by starting from the top-right corner of the rectangle R, it is possible to proceed right-to-left and top-to-bottom for encoding the image and generating the single-coloured sub-rectangles S.

It is also clear that the bitmapped information to be encoded instead of rectangular shape, as hereinbefore described, can be of any other shape, for example circular or triangular, and that it is possible to encode bitmapped information of any shape by using sub-areas not necessarily of rectangular shape.

As a second example, when bitmapped rectangles represent changes to a Graphical User Interface (GUI display), i.e. a screen of windows, images and text such as would appear on a PC or Unix Workstation, it is clear that such rectangles are often dominated by one pixel value; this observation leads to a variant of the algorithm in which the most prevalent pixel value V is determined in an initial pass, either exactly by fully enumerating all pixel values, or probabilistically by enumerating a randomly selected subset of the pixel values.

In this case, all cells of pixel value V (the background value) are marked as consumed before the basic method of the invention is run, and the output is prepended with the background rectangle parameters (V,O,O,W,H).

Reconstruction can be done as for the basic method of the invention, so long as the special background rectangle is drawn first and the remaining sub-rectangles are drawn in overlay mode.

The number of sub-rectangles required to represent the image can be reduced by determining the background pixel value V by running the basic algorithm and choosing the pixel value which appears in the greatest number of sub-rectangles, rather than simply the most prevalent value on a pixel-by-pixel basis.

In this case it is possible to reduce the number of subrectangles at the cost of a very slightly more complicated algorithm.

A variant to the basic algorithm differs from it as follows:

if the width W of rectangle R exceeds a threshold MAXW or if the height H of rectangle R exceeds a threshold MAXH, then the rectangle R is partitioned into a number of smaller rectangles each of which has height less than or equal to MAXH and width less than or equal to MAXW. Each of these smaller rectangles is then encoded using the basic algorithm.

Typically, MAXH and MAXW will be chosen such that the (x,y,w,h) parameters in the output tuples can each be represented in a small amount of storage, e.g., a single byte or less.

For bitmapped rectangles which represent changes to a GUI display, this variant almost invariably reduces the number of bytes required to encode those rectangles, thereby increasing the speed with which those rectangles may be transmitted from server to client. This effect occurs because the identification of those portions of the GUI display which are unsuitable for the basic encoding (and therefore better left unencoded) happens at a much finer granularity in the variant than in the basic algorithm. By varying the values of MAXH and MAXW, this granularity can be varied to an optimal level. The determination of MAXH and MAXW values can be done either statically (i.e., before the method is employed) or dynamically (i.e., as the method is being employed, possibly varying from rectangle to rectangle based on analysis of previous encodings.).

As indicated above, the primary application of this invention is the transmission of bitmapped rectangles of information from a modified X-server to a Java applet for real-time rendering. In fact the example has been developed for providing much better performance than other approaches, such as standard runlength encoding (RLE), in the transmission of bitmapped images from a server to a relatively slow computer or client.

Compared to RLE, the encoding method of the invention gives similar levels of raw compression, but gives much better compression in terms of the number of drawing primitives required to reproduce the output, it is particularly simple to implement, much more so than most other compression schemes used for images.

In general, compressing images into sets of simple drawing primitives makes sense when the images are to be transmitted to a client which must render the images in real time but which does not possess the capability to perform complex decompression in real time.

There are almost certainly instances other than this particular example where this is the case and hence where this invention would prove useful.

In addition, there may well be classes of two-dimensional information or data other than bitmapped images which would benefit from this invention both for purposes of compression and for post-processing after transmission or storage.

Therefore the encoding method of the invention could be used for other things as well.

Moreover, the invention could easily be extended to 3 or more dimensions, e.g. to compress 3D volumes.

What is claimed is:

1. A method for encoding digital information to be transmitted from a first device to a second device, wherein said digital information is mapped according to a map of rows and columns which define a plurality of cells and wherein each of said cells has a pixel value, said method being characterized by the following steps:

from a predetermined first cell having a certain pixel value, determining the largest area of cells, adjacent to said first cell, having the same pixel value as said first cell;

generating a code indicative of the row-column position of said first cell, of the dimensions of said largest area, and of said pixel value common to all the cells of said area;

determining whether the dimensions of said largest area exceed predetermined limits and if the result of the determination is that said limits are exceeded, subdividing said largest area into smaller areas, the dimensions of which are less than said predetermined limits;

generating a code indicative of the row-column position of said first cell, of the dimensions of said largest area, and of said pixel value common to all the cells of said area;

proceeding to a second cell, adjacent to said area and having a pixel value different from the pixel value of said first cell;

from said second cell, determining another largest area of cells, adjacent to said second cell, having the same pixel value as said second cell;

generating a code indicative of the row-column position of said second cell, of the dimensions of said largest area, and of said pixel value common to all the cells of said area; and repeating said steps until all said cells have been encoded.

2. A method according to claim 1 characterised in that said largest area is a rectangle.

3. A method according to claim 1 characterised in that said map is of rectangular shape and comprises n rows and m columns.

4. A method according to claim 1 characterised by the initial step of determining the most prevalent pixel value of said digital information.

5. A method for encoding digital information to be transmitted from a first device to a second device, wherein said digital information is mapped according to a plurality of cells disposed by rows and columns in a predetermined area and wherein each of said cells has a pixel value, characterized by the following steps:

setting a first cell as a current cell;

determining the largest subarea of said area containing said current cell and formed entirely of cells each of whose pixel value is the same as that of said current cell and each of which is not contained in any subarea already generated;

generating a code indicative of the dimensions of said subarea, of the column-row position and pixel value of said current cell;

determining whether the dimensions of said largest subarea exceed predetermined limits and if the result of the determination is that said limits are exceeded, subdividing said largest subarea into smaller areas, the dimensions of which are less than said predetermined limits;

generating a code indicative of the dimensions of said subarea, of the column-row position and pixel value of said current cell;

locating another cell which is not contained in any subarea already generated;

naming said another cell as new current cell and repeating said steps until all said cells have been encoded.

6. A method according to claim 5 characterised in that said largest subarea is a rectangle.

7. A method according to claim 5 characterised in that said predetermined area is a rectangle.

8. A method according to claim 5 characterised by the initial step of determining the most prevalent pixel value of said digital information.

9. A method for encoding digital information, said digital information forming a rectangle of width W and height H having W×H cells, each cell containing a pixel value of a predetermined number of bits, characterised by the following steps:

marking said W×H cells as free and setting a cell as a current cell, said current cell being a corner cell of said rectangle;

determining a subrectangle of said rectangle, said subrectangle being the largest one whose corner is said current cell and which consist entirely of cells whose pixel value are the same as the pixel value of said current cell;

generating a code for describing said subrecrangle, said code comprising said pixel value, the column-row position of said current cell and the width and height value of said subrectangle;

marking all cells of said subrectangle as consumed;

proceeding from said current cell until a free cell is encountered or stop if no free cell remains;

naming said free cell as new current cell and repeating said steps restarting from said second step.

10. A method according to claim 9 characterised by the initial step of determining the most prevalent pixel value of said digital information.

11. A method for encoding data stored in an array of cells each storing data values, characterized by the steps of:

a) selecting a current cell storing a data value;

b) determining the largest area of cells adjacent to said current cell storing the same data value as the current cell;

b1) determining whether the dimensions of said largest area exceed predetermined limits and if the result of the determination is that said limits are exceeded, subdividing said largest area into smaller areas, the dimensions of which are less than said predetermined limits c) generating a code representing, the location of the current cell in the array, the size of said largest area, and said data value;

d) selecting a new current cell; and e) repeating steps b) to d) and step b1) as necessary until all cells have been encoded.

12. The method of claim 1 further characterized by the step of generating a code indicative of the row-column position of each of said smaller areas, of dimensions of each of said smaller areas and of said pixel value common to each of said smaller areas.

13. A method for encoding digital information to be transmitted from a first device to a second device, wherein said digital information is mapped according to a map of rows and columns which define a plurality of cells and wherein each of said cells has a pixel value, said method being characterized by the following steps:

determining whether the dimensions of an area covered by the map of rows and columns exceed predetermined limits, and if the result of the determination is that said limits are exceeded, subdividing said area into smaller areas, the dimensions of which are less than said predetermined limits;

and for each of said smaller areas, performing the following steps:

(a) from a predetermined first cell having a certain pixel value, determining the largest area of cells adjacent to said first cell, having the same pixel value as said first cell;

(b) generating a code indicative of the row and column position of said first cell, of the dimensions of said largest area, and of said pixel value common to all the cells of said area;

(c) proceeding to a second cell, adjacent to said largest area and having a pixel value different from the pixel value of said first cell; and (d) repeating steps (a), (b) and (c) until all the cells in each smaller area have been encoded.

* * * * *